United States Patent
Nakano (10) Patent No.: US 6,529,257 B1
(45) Date of Patent: Mar. 4, 2003

(54) ACTIVE-MATRIX LIQUID-CRYSTAL DISPLAY APPARATUS WHICH PREVENTS FLICKER AND IMAGE STICKING IN MAIN DISPLAY AREA AND SUB DISPLAY AREA

(75) Inventor: Akira Nakano, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 33 days.

(21) Appl. No.: 09/687,633

(22) Filed: Oct. 12, 2000

(30) Foreign Application Priority Data

Oct. 14, 1999 (JP) .......................................... 11-292967

(51) Int. Cl.⁷ .............................................. G02F 1/136
(52) U.S. Cl. ........................ 349/143; 349/43; 359/59; 345/52; 345/88
(58) Field of Search ..................... 349/143, 43; 359/59; 345/52, 88

(56) References Cited

U.S. PATENT DOCUMENTS 5,519,521 A * 5/1996 Okimoto et al. .............. 359/59

FOREIGN PATENT DOCUMENTS

| JP | Hei-2-244880 | 9/1990 |
| JP | Hei-4-334276 | 11/1992 |

* cited by examiner

Primary Examiner—William L. Sikes
Assistant Examiner—Thoi V Duong
(74) Attorney, Agent, or Firm—Brinks Hofer Gilson & Lione (57) ABSTRACT

Opposed electrodes are separately provided correspondingly to a main display area and a sub display area in an active-matrix liquid-crystal display apparatus. The most-appropriate voltages are applied to the opposed electrode corresponding to the main display area and to the opposed electrode, corresponding to the sub display area, according to the size of each pixel zone disposed in each display area.

9 Claims, 7 Drawing Sheets

ACTIVE-MATRIX LIQUID-CRYSTAL DISPLAY APPARATUS WHICH PREVENTS FLICKER AND IMAGE STICKING IN MAIN DISPLAY AREA AND SUB DISPLAY AREA

BACKGROUND OF THE INVENTION

1. Field of the Invention

The present invention relates to active-matrix liquid-crystal display apparatuses, and more particularly, to the structure of opposed electrodes used in an active-matrix liquid-crystal display apparatus which is provided with a main display area and a sub display area having pixel zones different in size from each other.

2. Description of the Related Art

Figure 6:
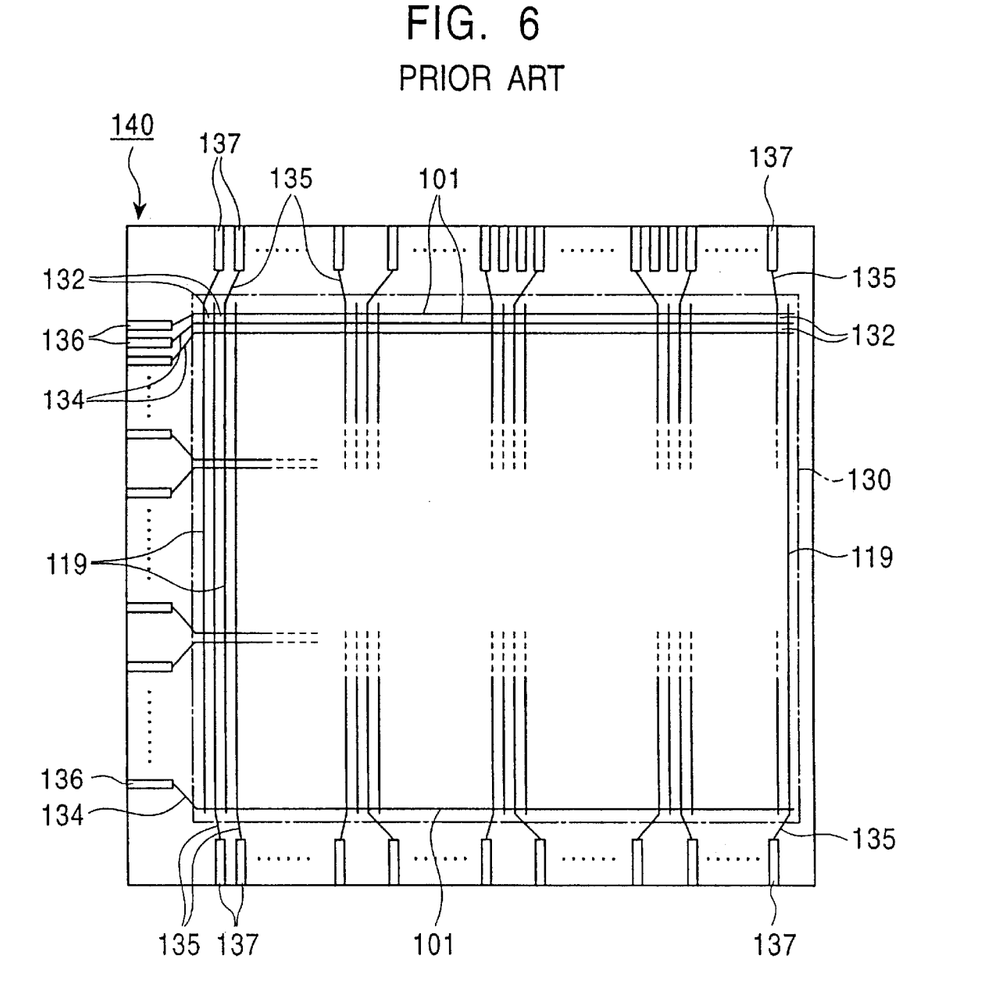
FIG. 6 is a plan of a conventional TFT-array substrate.

FIG. 6 shows a conventional active-matrix liquid-crystal display apparatus. More specifically, FIG. 6 is a plan view of a thin film-transistor (hereinafter called TFT) array substrate 140.

The TFT array substrate 140 of the conventional active-matrix liquid-crystal display apparatus is formed of a display area 130 where pixel zones 132 constituting pixels are disposed in a matrix manner, scanning-line leads 134 and scanning-line terminals 136 used for connecting scanning lines 101 disposed in the display area 130 to a gate-driver IC provided outside, and signal-line leads 135 and signal-line terminals 137 used for connecting signal lines 119 disposed in the display area 130 to a source-driver IC provided outside.

Figure 1:
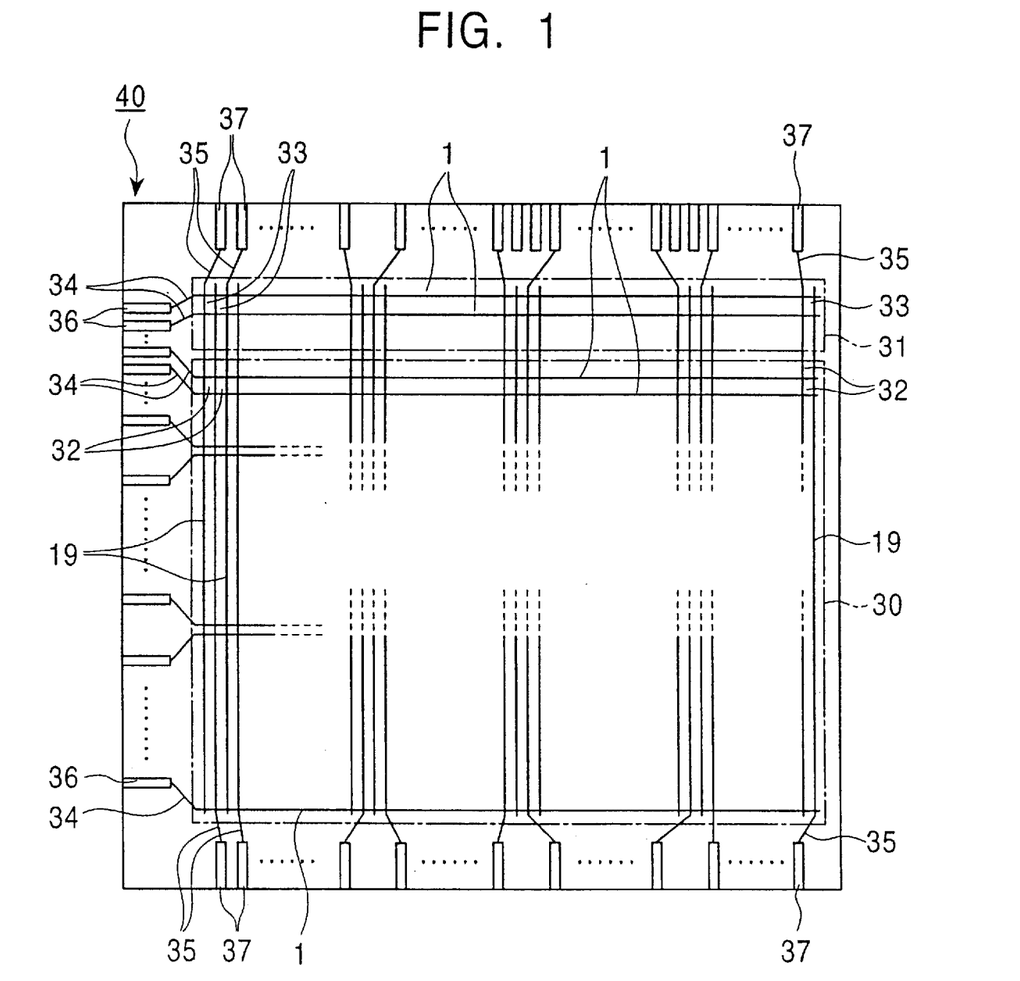
FIG. 1 is a plan of a TFT array used in an active-matrix liquid-crystal display apparatus according to an embodiment of the present invention.

In addition to a display area 30 (hereinafter called a main display area), another display area 31 (hereinafter called a sub display area) has been proposed for displaying character information, for example, as shown in FIG. 1. This increases the complexity of the conventional LCD apparatus, but adds functionality as well.

In this case, although the size of each pixel zone 32 is decreased because high resolution is required for the main display area 30, it is not necessary for each pixel zone 33 to have the same size as each pixel zone 32 in the main display area due to the display purpose of pixels in the sub display area. Rather, each pixel zone 33 in the sub display area 31 is designed such that it is larger than each pixel zone 32 in the main display area 30 since it is required that, for example, characters be displayed large for easy recognition.

Figure 7:
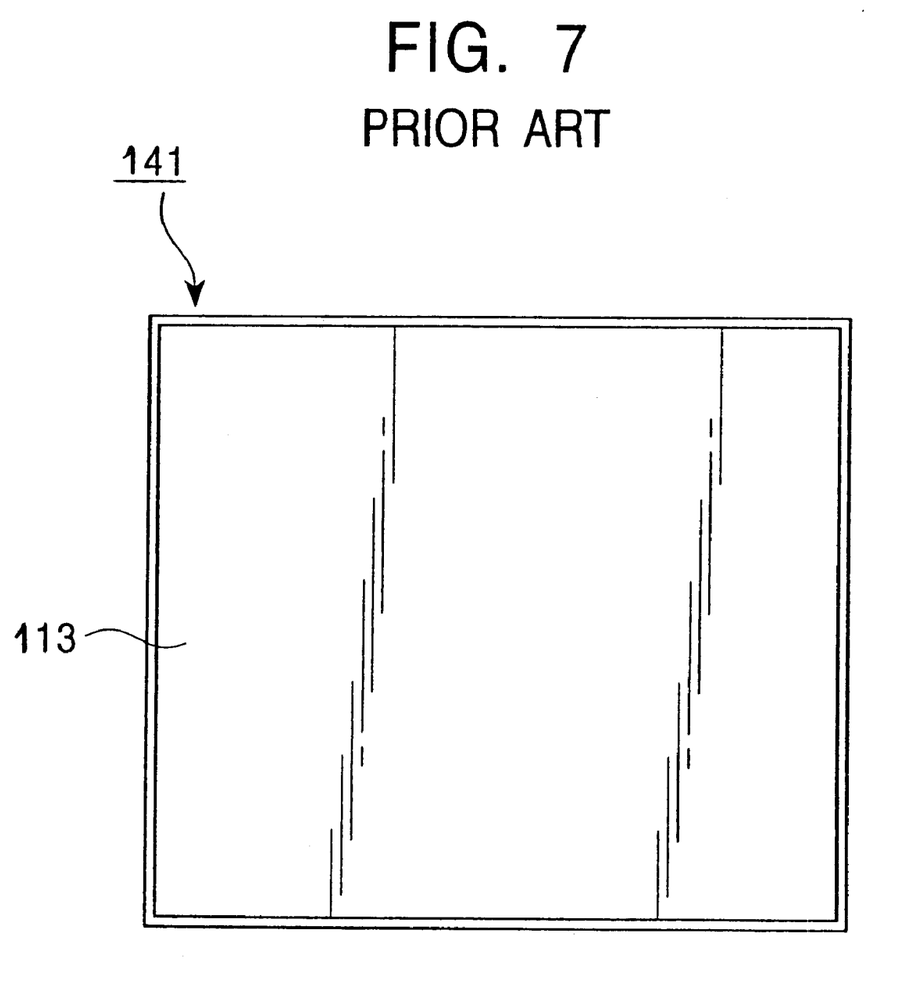
FIG. 7 is a plan showing a conventional opposed electrode.

In a conventional liquid-crystal display apparatus having a sub display area, one opposed electrode 113 common to the whole surface of an opposed substrate 141 is formed, as shown in FIG. 7.

In each of active-matrix liquid-crystal display apparatuses, a liquid-crystal layer is sandwiched by a pair of substrates disposed oppositely and used as a display medium. An AC voltage on which a DC voltage is not superposed is applied to the liquid-crystal layer to prevent image sticking on the liquid-crystal layer. The AC voltage is used as a display voltage, and is applied to pixel electrodes mainly constituting pixel zones from signal lines through TFTs that have been turned on by gate voltages applied from scanning lines. A constant DC voltage is applied to an opposed electrode disposed oppositely to the pixel electrodes through the liquid-crystal layer. With this operation, an electric field is applied to the liquid-crystal layer to change its refractive index, and thus the liquid-crystal layer can be used as a display medium.

A dynamic voltage drop occurs in the potential Vp of the pixel electrodes when the gate voltages are changed in order to turn off the TFTs because the dielectric constant of the liquid crystal changes according to the electric-field strength, a parasitic capacitance is formed between the gate electrode and the drain electrode of each TFT, and a parasitic capacitance is formed between a scanning line and the pixel electrode.

Figure 5:
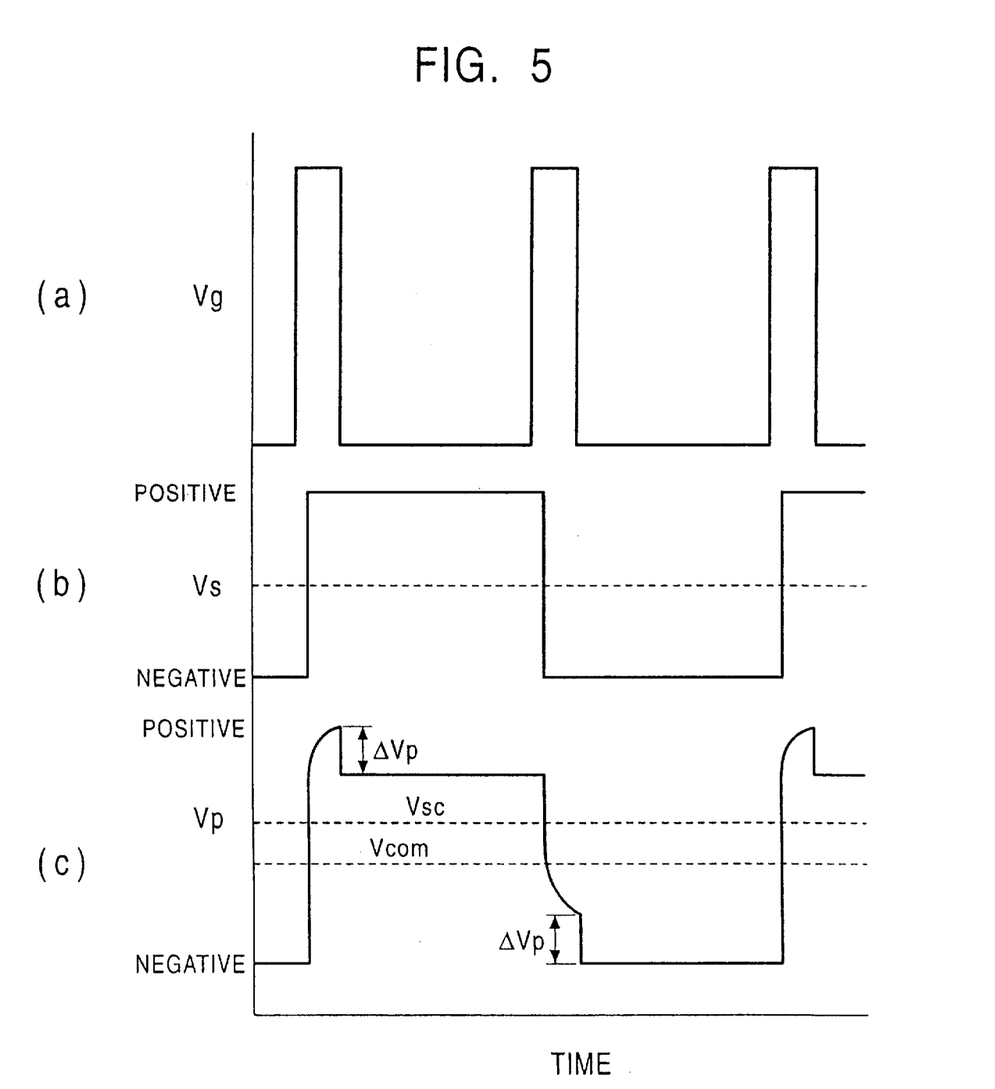
FIG. 5 is a view showing driving voltages of the liquid-crystal display apparatus.

FIG. 5 is an outlined view of driving voltages for the liquid-crystal display apparatus. In FIG. 5, (a) shows a voltage Vg applied to the gate electrode of a TFT, (b) shows a voltage Vs applied to the source electrode of the TFT, and (c) shows the voltage Vp of the drain electrode of the TFT, namely, the pixel electrode. In (c) of FIG. 5, Vsc indicates the center voltage of an AC voltage applied to the source electrode, and Vcom indicates a voltage applied to the opposed electrode. Since the voltages Vcom and Vp are applied to the opposed electrode and the pixel electrode, respectively, an effective potential is given to the liquid-crystal layer and the liquid-crystal layer operates as a display medium. The horizontal axis indicates time in FIG. 5 to show the Vg, Vs, and Vp timing. The TFT is "on" while the voltage shown in (a) of FIG. 5 is high, and the TFT is "off" while the voltage is low.

When the gate voltage Vg is changed in order to turn off the TFT, a dynamic voltage drop $\Delta Vp$ occurs at the potential Vp of the pixel electrode as shown in (c) of FIG. 5. This is because, when the gate voltage Vg is changed in order to turn off the TFT, charges are distributed among the capacitor formed by the liquid-crystal layer between the pair of substrates; a storage capacitor formed by a scanning line, and a gate insulating film and a capacitor electrode disposed thereabove; and the above-described parasitic capacitors to generate the voltage drop $\Delta Vp$ at the potential Vp of the pixel electrode.

The voltage drop $\Delta Vp$ generated at the potential of the pixel electrode 11 is shown by the following expression (1).

$$\Delta Vp = (Vgh \times (Cgdon + Cgp) - Vgl \times (Cgdoff + Cgp) - Vs(Cgdon - Cgdoff))/(Cs + Clc + Cgdoff + Cgp) \quad (1)$$

where, $\Delta Vp$: Voltage drop at the potential of the pixel electrode

Vgh: High potential of the gate voltage

Cgdon: Parasitic capacitance obtained when the TFT is "on"

Cgp: Parasitic capacitance obtained between the scanning line and the pixel electrode Vgl: Low potential of the gate voltage Cgdoff: Parasitic capacitance obtained when the TFT is "off"

Vs: Potential of the signal voltage

Cs: Storage capacitance

Clc: Capacitance of the liquid-crystal layer

The factors which cause the voltage drop $\Delta Vp$ at the potential of the pixel electrode includes the capacitance Clc of the liquid-crystal layer, the parasitic capacitance Cgd of the thin-film transistor, and the storage capacitance Cs, as shown in the expression (1).

The dielectric constant of the liquid crystal, one factor causing the voltage drop $\Delta Vp$, changes according to the electric-field strength. This change relates to the characteristics of the liquid crystal. In the two parasitic capacitances, that formed between the TFT gate electrode and the TFT drain electrode and that formed between a scanning line and the pixel electrode, which are other factors causing the voltage drop $\Delta Vp$, the parasitic capacitance formed between the TFT gate electrode and the TFT drain electrode is a capacitance generated by the gate insulating film formed between the electrodes, and originates from the structure of current active-matrix liquid-crystal display apparatuses.

When the voltage drop $\Delta Vp$ occurs at the potential $Vp$ of the pixel electrode as described above, the positive and negative voltage amplitudes of the potential $Vp$ of the pixel electrode differ. When an identical-amplitude voltage is applied irrespective of its polarity, liquid crystal shows an identical transmittance. Therefore, in a normally-white active-matrix liquid-crystal display apparatus which has a high transmittance when a voltage is not applied, for example, the transmittance is lower at a polarity where the voltage amplitude is larger, and the transmittance is higher at a polarity where the voltage amplitude is smaller. Consequently, the repetition of brightness and darkness occurs according to the transmittances, and this pattern is seen as flicker.

When voltage amplitudes are not symmetrical for the positive and negative polarities, a DC voltage superposed on an AC voltage is always applied to any of pixel electrodes, and an image remains on the screen, which is so-called image sticking.

Therefore, flicker and image sticking are conventionally avoided by adequately adjusting the potential of the opposed electrode such that the voltage amplitudes of the AC voltage driving the liquid crystal are equal at the positive and negative sides and by forming storage capacitors in parallel to the capacitor generated by the liquid-crystal layer.

When a sub display area having different pixel zones from those of a main display area is provided in addition to the main display area, since the values of the liquid-crystal capacitance and the parasitic capacitances differ according to the size of pixel zones, the voltage drops $\Delta Vp$ at pixel electrodes differ between the main display area and the sub display area. As a result, when the common opposed electrode is used as shown in the conventional case although the most-appropriate potentials applied to the opposed electrode differ between the main display area and the sub display area, the most-appropriate voltage is not applied to the opposed electrode corresponding to one of the main display area and the sub display area. Flicker occurs in either the main display area or the sub display area. In addition, image sticking occurs in either the main display area or the sub display area.

SUMMARY OF THE INVENTION

Accordingly, it is an object of the present invention to provide an active-matrix liquid-crystal display apparatus having a main display area and a sub display area having pixel zones of differing sizes, which has opposed electrodes for each of the main display area and the sub display area to allow the most-appropriate voltages to be applied to the respective opposed electrode and which is provided with a mechanism that prevents flicker and image sticking.

In other words, an object of the present invention is to provide an active-matrix liquid-crystal display apparatus in which an appropriate opposed-electrode voltage Vcom is applied to each opposed electrode when different voltage drops $\Delta Vp$ occur at the main display area and the sub display area, such that the voltage amplitudes are equal at the positive and negative polarities in each display area.

The foregoing object is achieved in one aspect of the present invention through a provision of an active-matrix liquid-crystal display apparatus including: a pair of substrates disposed oppositely and a liquid-crystal layer sandwiched by the pair of substrates. A plurality of scanning lines and a plurality of signal lines are formed in a matrix on one of the pair of substrates. The thin-film transistors have gate electrodes connected to the plurality of scanning lines, and pixel electrodes and storage capacitors connected to the thin-film transistors, all of which are disposed in the vicinity of intersections of the plurality of scanning lines and the plurality of signal lines. A main display area and a sub display area have pixel zones of different sizes enclosed by the plurality of scanning lines and the plurality of signal lines. A plurality of opposed electrodes are formed between another of the pair of substrates and the liquid-crystal layer, of which one opposed electrode is disposed oppositely to the main display area and another opposed electrode is disposed oppositely to the sub area.

The active-matrix liquid-crystal display apparatus may be configured such that the size of each pixel zone in the main display area is smaller than that of each pixel zone in the sub display area.

The active-matrix liquid-crystal display apparatus may further include a voltage supply to apply different voltages to the opposed electrode disposed oppositely to the main display area and to the opposed electrode disposed oppositely to the sub display area.

In this case, the active-matrix liquid-crystal display apparatus may be configured such that the size of each pixel zone in the main display area is smaller than that of each pixel zone in the sub display area, and the voltage supply applies a lower voltage to the opposed electrode disposed oppositely to the main display area than a voltage applied to the opposed electrode disposed oppositely to the sub display area.

When the size of each pixel zone in the main display area differs from that of each pixel zone in the sub display area, separate voltage supplies are provided as the voltage supply to apply different voltages to the opposed electrodes disposed oppositely to the main display area and the sub display area, according to the size of each pixel zone. One voltage supply may be provided in order to apply different voltages to the opposed electrodes.

When the main display area has a high resolution for displaying images, and the sub display area is used for displaying characters (i.e. lower resolution is acceptable), for example, the size of each pixel zone in the main display area is smaller than that of each pixel zone in the sub display area and a lower voltage is applied to the opposed electrode disposed oppositely to the main display area than a voltage applied to the opposed electrode disposed oppositely to the sub display area.

In other words, in the expression (1), since the size of each pixel zone in the sub display area is larger, the capacitance Clc of the liquid-crystal layer is large and therefore the voltage drop $\Delta Vp$ is small. To make voltage amplitudes in the positive and negative polarities equal in (c) of FIG. 5, a voltage applied to the opposed electrode disposed oppositely to the sub display area is higher than that applied to the electrode disposed oppositely to the main display. With this operation, the most-appropriate voltages are applied to the opposed electrodes according to the size of each pixel zone, and thus flicker and image sticking are avoided.

In addition, a method for decreasing image sticking and flicker in a liquid crystal display is provided. The method comprises providing a main display area having pixels of a first pixel size and a sub display area having pixels of a second pixel size. Voltages determined by pixel size are supplied to each display area.

The method may further comprise displaying character information in the sub display area. The supplying of the voltages to each display area may further comprise providing each voltage through an opposed electrode.

DESCRIPTION OF THE PREFERRED EMBODIMENT

An embodiment of the present invention will be described below by referring to the drawings.

FIG. 1 is a plan of a TFT array substrate 40 used in an active-matrix liquid-crystal display apparatus according to an embodiment of the present invention.

In one preferred embodiment of the present invention, a number of pixel zones 32 and 33 are arranged in a matrix in a main display area 30 and a sub display area 31 on the TFT array substrate 40. The pixel zones are enclosed by scanning lines 1 and signal lines 19. The size of each pixel zone disposed in the main display area 30 is different from that of each pixel zone disposed in the sub display area 31.

More specifically, the size of each pixel zone 32 disposed in the main display area 30 is 40 µm in width and 120 µm in height, and the size of each pixel zone 33 disposed in the sub display area 31 is 40 µm in width and 400 µm in height.

In the present embodiment, the sub display area, which includes the pixel zones 33 having a larger size than the pixel zones 32 disposed in the main display area 30, is formed next to the main display area 30 such that the widths of their pixel zones match in the scanning-line direction.

In these pixel zones, the scanning lines 1 for scanning the pixel zones and the signal lines 19 for sending signals are formed in a lattice. The signal lines 19 are continuously disposed without any disconnection in the main display area 30 and the sub display area 31, where the sizes of the pixel zones differ.

Figure 4:
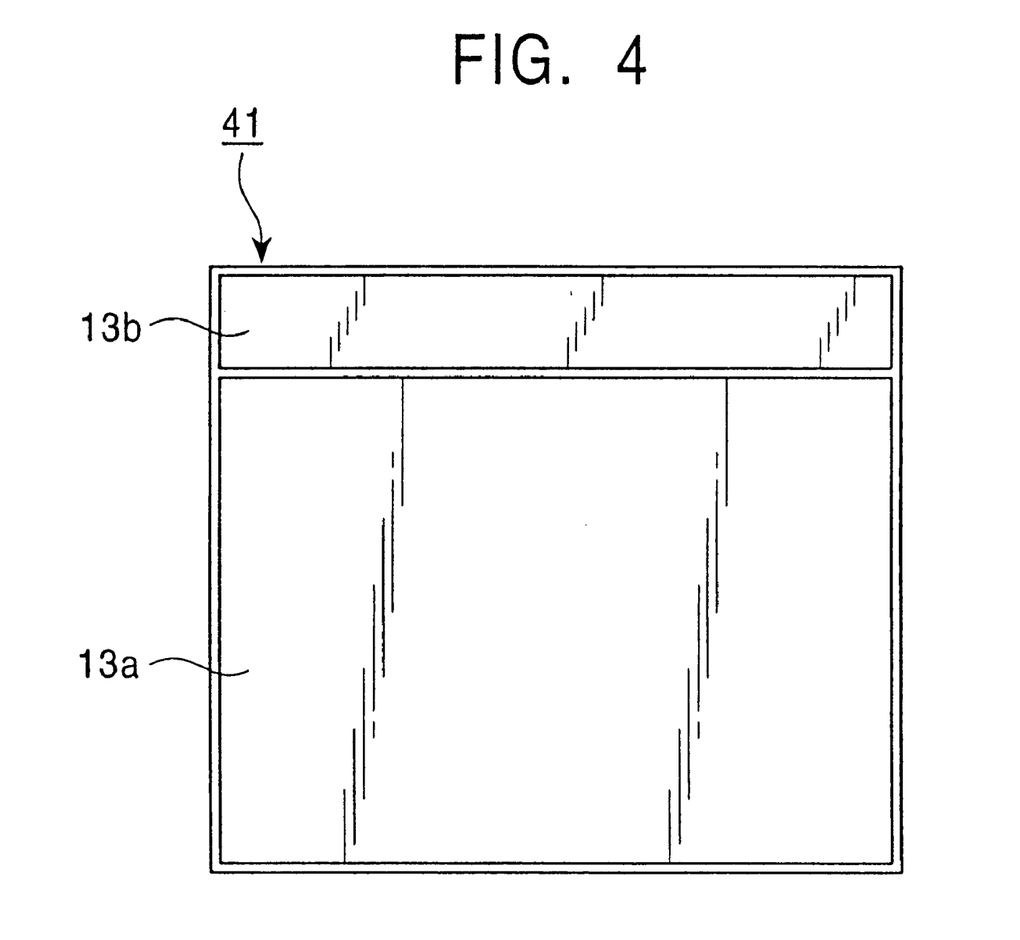
FIG. 4 is a plan of opposed electrodes according to the present invention.

FIG. 4 illustrates an opposed substrate 41 disposed oppositely to the TFT array substrate 40. The opposed substrate 41 comprises opposed electrodes 13a and 13b opposite to the main display area 30 and the sub display area 31, respectively, and different voltages are applied to the opposed electrodes.

Around the main display area 30 and the sub display area 31, leads 34 connect the scanning lines 1 to scanning-line terminals 36. The scanning-line terminals 36 connect the scanning lines 1 disposed in the display areas 30 and 31 to a gate-driver IC (not shown). Similarly, leads 35 connect the signal lines 19 to signal-line terminals 37, which connect the signal lines 19 disposed in the display areas 30 and 31 to a source-driver IC (not shown). In an alternate embodiment, a driving circuit is built in the TFT array substrateand the leads for the scanning lines and for the signal lines may be connected to the outputs of the driving circuit.

Figure 2:
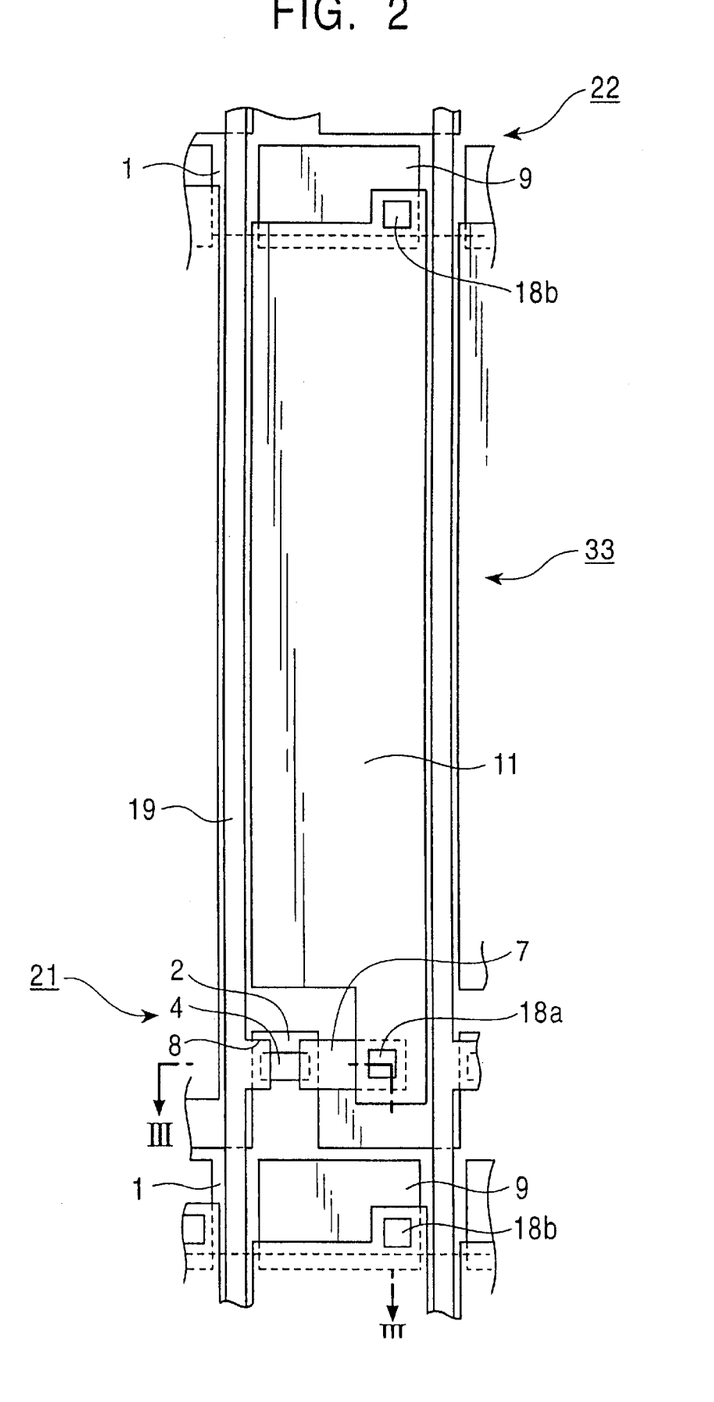
FIG. 2 is an enlarged plan of a vicinity of one pixel zone in a sub display area disposed on the TFT array substrate shown in FIG. 1.
Figure 3:
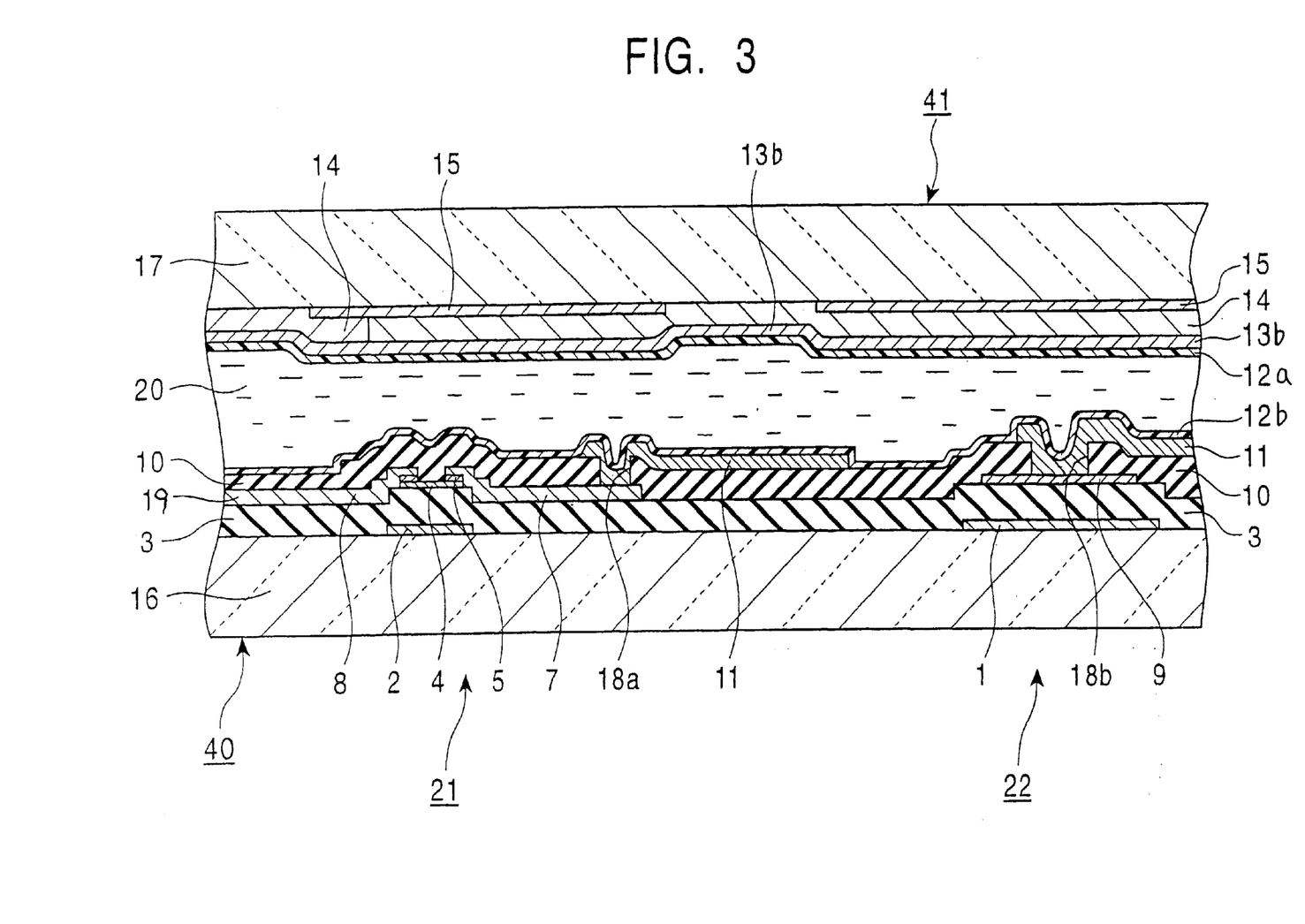
FIG. 3 is a sectional view taken on line III—III in FIG. 2.

FIG. 2 is an enlarged plan of one pixel zone 33 disposed in the sub display area 31 of the liquid-crystal display apparatus according to the present embodiment. FIG. 3 is a sectional view taken on line III—III, which passes through a TFT 21, a contact hole 18a, and a capacitor electrode 9 in FIG. 2. Each pixel zones 32 of the main display area 30 have the same structure as each pixel zones 33 of the sub display area 31 except for the size.

As shown in FIG. 2, the pixel zone 33 of the sub display area 31 is enclosed by scanning lines 1 and signal lines 19. The TFT 21 is formed at the lower left portion of FIG. 2, and a storage capacitor 22 is formed at the upper portion. At the center of FIG. 2, the pixel electrode 11 is disposed.

In the liquid-crystal display apparatus using the TFT array substrate 40, the opposed substrate 41 is disposed oppositely to the TFT array substrate 40 through the liquid-crystal layer 20, as shown in FIG. 3. The opposed substrate 41 is provided with a light-shielding black matrix 15, a color filter 14, and a transparent opposed electrode 13b made from indium-tin oxide (hereinafter called ITO), which is also used for the pixel electrode 11. An alignment layer 12a is formed on a surface contacting the liquid crystal 20. Therefore, when a voltage is applied between the pixel electrode 11 and the opposed electrode 13b, an electric field is applied to the liquid-crystal layer 20 and alignment control can be applied to liquid-crystal molecules. This structure can be regarded as a capacitor (hereinafter called a liquid-crystal capacitor) because the liquid-crystal layer 20, which is a dielectric, is sandwiched by the pixel electrode 11 and the opposed electrode 13b.

In a TFT, as shown in FIG. 2 and FIG. 3, a gate electrode 2 connected to a scanning line 1 is provided. A gate insulating film 3 made from silicon nitride is formed thereon. A semiconductor film 4 made from amorphous silicon is formed on the gate insulating film 3. An ohmic-contact film 5 made from n+ (phosphorous doped) amorphous silicon is formed on the semiconductor film 4 and a drain electrode 7 and a source electrode 8 both made from a conductor are formed on the ohmic-contact film 5. The source electrode 8 is led from the signal line 19. A silicon nitride passivation film 10 covers the drain electrode 7 and the source electrode 8, and a second alignment film 12b is formed on the passivation film 10 and the pixel electrode 11. The second alignment film 12b contacts the liquid crystal layer 20. A contact hole 18a is formed in the passivation film 10 disposed on the drain electrode 7. The drain electrode 7 is connected to the transparent pixel electrode 11 made from ITO through the contact hole 18a.

In the storage capacitor 22, the scanning line 1 serves as an electrode, the gate insulating film 3 formed thereon serves as a dielectric, and a capacitor electrode 9 is formed thereon to serve as the other electrode. The capacitor electrode 9 is made from the same conductor as the drain electrode 7 and the source electrode 8. In the same way as in the TFT 21, a passivation film 10 is formed on the capacitor electrode 9. A contact hole 18b is formed in the passivation film 10. The pixel electrode 11 made from ITO is led above the capacitor electrode 9, and is connected to the capacitor electrode 9 through the contact hole 18b. The storage capacitor 22 is connected to the liquid-crystal capacitor in parallel. Both the storage capacitor 22 and the liquid crystal capacitor serve as load capacitors of the TFT 21.

In the present embodiment, the main display area 30 having the pixel zones each 40 µm wide and 120 µm high, and the sub display area 31 having the pixel zones each 40 µm wide and 400 µm high are formed on the same TFT array substrate 40. Opposed electrodes 13a and 13b disposed oppositely to the above display areas are disposed separately on the opposed substrate 41 as shown in FIG. 4. The opposed electrodes 13a and 13b are made from the same ITO film as the pixel electrode 11. The sizes of the opposed electrodes 13a and 13b are almost equal to the sizes of the main display area 30 and the sub display area 31.

Two DC/DC converters (not shown), which generate DC voltages, are used as a voltage supply to separately apply the most-appropriate voltages to the opposed electrodes. Each DC/DC converter generates the most-appropriate voltage to the corresponding opposed electrode and applies it to the electrode. Alternatively, a single voltage supply may be used to apply the most-appropriate voltages to the opposed electrodes.

In the present embodiment, since the size of each pixel zone 32 of the main display area 30 is smaller than that of each pixel zone 33 of the sub display area 31, the voltage applied to the opposed electrode 13a of the main display area 30 is lower than that applied to the opposed electrode 13b of the sub display area 31. In a preferred embodiment, for example, the voltage applied to the opposed electrode 13a of the main display area 30 is set to 3.7 V, and the voltage applied to the opposed electrode 13b of the sub display area 31 is set to 4.0 V. Note that these voltages are arbitrary and may be set according to the desired LCD characteristics.

As described above, different voltages are applied to the two opposed electrodes corresponding to two display areas having different-size pixel zones. In other words, in (c) of FIG. 5, Vcom is changed according to the size of each pixel zone disposed in a display area to cancel out a difference between: the voltage amplitudes in the positive and negative polarities.

What is claimed is:

1. An active-matrix liquid-crystal display apparatus comprising:
    a pair of substrates disposed oppositely;
    a liquid-crystal layer sandwiched by said pair of substrates;
    a plurality of scanning lines and a plurality of signal lines formed in a matrix on one of said pair of substrates;
    thin-film transistors having gate electrodes connected to said plurality of scanning lines, and pixel electrodes and storage capacitors connected to said thin-film transistors, the thin-film transistors, gate electrodes, pixel electrodes and storage capacitors being disposed in a vicinity of intersections of said plurality of scanning lines and said plurality of signal lines;
    a main display area and a sub display area having pixel zones of different sizes enclosed by said plurality of scanning lines and said plurality of signal lines;
    a plurality of opposed electrodes formed between another of said pair of substrates and said liquid-crystal layer, one opposed electrode of said plurality of opposed electrodes being disposed oppositely to said main display area and another opposed electrode of said plurality of opposed electrodes being disposed oppositely to said sub area; and
    a voltage supply to apply different voltages to the opposed electrode disposed oppositely to the main display area and to the opposed electrode disposed oppositely to the sub display area, the different voltages applied dependent on values of a liquid-crystal capacitance formed between each pixel electrode and the respective opposed electrode and parasitic capacitances formed between the gate and drain of each thin-film transistor and formed between each pixel electrode and each scanning line, the different voltages caused by the difference in size of the pixel zones in the main display area and in the sub display area.

2. An active-matrix liquid-crystal display apparatus according to claim 1, the size of each pixel zone in said main display area being smaller than the size of each pixel zone in said sub display area.

3. An active-matrix liquid-crystal display apparatus according to claim 1,
    the size of each pixel zone in said main display area being smaller than the size of each pixel zone in said sub display area, and
    said voltage supply applying a lower voltage to the opposed electrode disposed oppositely to said main display area than a voltage applied to the opposed electrode disposed oppositely to said sub display area by $\Delta Vp$.

4. An active-matrix liquid-crystal display apparatus comprising:
    a pair of substrates disposed oppositely;
    a liquid-crystal layer sandwiched by said pair of substrates;
    a plurality of scanning lines and a plurality of signal lines formed in a matrix on one of said pair of substrates;
    thin-film transistors having gate electrodes connected to said plurality of scanning lines, and pixel electrodes and storage capacitors connected to said thin-film transistors, the thin-film transistors, gate electrodes, pixel electrodes and storage capacitors being disposed in a vicinity of intersections of said plurality of scanning lines and said plurality of signal lines;
    a main display area and a sub display area, the main display area having pixel zones of a first size and the sub display area having pixel zones of a second size, the pixel zones of the main display area and sub display area being enclosed by said plurality of scanning lines and said plurality of signal lines;
    a pair of opposed electrodes formed between another of said pair of substrates and said liquid-crystal layer, one opposed electrode of said pair of opposed electrodes being disposed oppositely to said main display area and another opposed electrode of said pair of opposed electrodes being disposed oppositely to said sub display area; and
    a voltage supply to apply different voltages to the opposed electrode disposed oppositely to the main display area and to the opposed electrode disposed oppositely to the sub display area, the different voltages applied dependent on values of a liquid-crystal capacitance formed between each pixel electrode and the respective opposed electrode and parasitic capacitances formed between the gate and drain of each thin-film transistor and formed between each pixel electrode and each scanning line, the different voltages caused by the difference in first and second sizes.

5. An active-matrix liquid-crystal display apparatus according to claim 4 the first size being smaller than the second size.

6. An active-matrix liquid-crystal display apparatus according to claim 4
    the first size being smaller than the second size, and
    said voltage supply applying a lower voltage to the opposed electrode disposed oppositely to said main display area than a voltage applied to the opposed electrode disposed oppositely to said sub display area by ΔVp.

7. A method for decreasing image sticking and flicker in a liquid crystal display comprising:

providing a main display area having pixels of a first pixel size and a sub display area having pixels of a second pixel size; and applying different voltages to a first opposed electrode disposed oppositely to the main display area and a second opposed electrode disposed oppositely to the sub display area, the different voltages dependent on values of a liquid-crystal capacitance formed between respective pixel and opposed electrodes in each display area and parasitic capacitances formed between a gate and drain of a thin-film transistor in each display area and formed between the pixel electrodes and scanning line in each display area, the different voltages determined by pixel sizes in the display areas.

8. The method of claim 7, further comprising displaying character information in the sub display area.

9. The method of claim 7, further comprising applying a lower voltage to the first opposed electrode than to the second opposed electrode by ΔVp.

* * * * *

UNITED STATES PATENT AND TRADEMARK OFFICE
CERTIFICATE OF CORRECTION

PATENT NO. : 6,529,257 B1
DATED : March 4, 2003
INVENTOR(S) : Akira Nakano

It is certified that error appears in the above-identified patent and that said Letters Patent is hereby corrected as shown below:

Title page,
Item [57], ABSTRACT,
Line 6, delete "electrode, corresponding" and substitute -- electrode corresponding -- in its place.

Column 7,
Line 65, delete "area, the different voltages applied" and substitute -- area, wherein the different voltages are applied -- in its place.

Column 8,
Line 1, immediately after "electrode" insert -- , -- (comma).
Line 3, delete "the size" and substitute -- a size -- in its place.
Lines 4 and 58, delete "line, the different voltages caused" and substitute -- line; and wherein the different voltages are caused -- in its place.
Line 8, delete "the size" and substitute -- a size -- in its place.
Line 52, delete "area, the different voltages applied" and substitute -- area, wherein the different voltages are applied -- in its place.
Line 55, immediately after "electrode" insert -- , -- (comma).

Column 9,
Line 12, delete "area, the different voltages dependent" and substitute -- area, wherein the different voltages are dependent -- in its place.

Column 10,
Line 12, immediately after "area" insert -- , -- (comma).
Line 5, delete "area, the different voltages" and substitute -- area; wherein the different voltages are -- in its place.

Signed and Sealed this

Twenty-eighth Day of October, 2003

JAMES E. ROGAN
*Director of the United States Patent and Trademark Office*